July 21, 1964

J. O. MELTON ETAL
SPACER FOR INSERTION BETWEEN ADJACENT
CONVOLUTIONS OF A COIL SPRING
Filed April 20, 1962

3,141,661

INVENTORS
JAMES O. MELTON &
THOMAS B. WILKINSON
BY
Dunlap, Laney & Hubbard
ATTORNEYS

United States Patent Office 3,141,661
Patented July 21, 1964

3,141,661
SPACER FOR INSERTION BETWEEN ADJACENT
CONVOLUTIONS OF A COIL SPRING
James O. Melton, Norman, and Thomas B. Wilkinson,
Oklahoma City, Okla., assignors to Jamco, Inc., Oklahoma City, Okla., a corporation of Oklahoma
Filed Apr. 20, 1962, Ser. No. 189,076
3 Claims. (Cl. 267—60)

This invention relates to a spacing element for adjusting the effective length of a coil spring which is normally retained under compression between two bodies spaced from each other. More particularly, but not by way of limitation, the present invention relates to a spacing element adapted for insertion between adjacent convolutions of a coil spring of the type utilized in automobile running gear.

As it is well known to automobile repair and maintenance personnel, the coil springs which are utilized in the front and rear suspension of an automobile's running gear are prone to sag and become compressed to some degree as a result of age, overloading or hard driving over bad roads. Results of such sagging have been uneven carriage of the automobile body, that is, one side of the front or rear end of the automobile dipping closer to the road than the other side, and also the failure of the springs to function effectively in preventing metal to metal contact between the chassis and the lower suspension arm of the automobile when a road shock of large magnitude is encountered. Fatigued, sagging springs also cause the automobile to steer erratically and less easily upon application of the brakes.

It has heretofore been the practice of automobile maintenance personnel to effect a partial correction of the undesirable results stemming from the fatiguing and sagging of the coil springs by inserting spacing blocks between some of the convolutions of the springs, or by inserting an arcuate spacing element underneath the spring between the lowermost convolution thereof and the spring retainer which is attached to the A-shaped lower control arm of the automobile. These spacers all function to increase the spacing between the upper and lower control arms to its original dimension.

The types of spacing blocks, or "spacers" as they will hereinafter be termed, which have preveiously been utilized to correct the sagging spring situation have been of two general types, both of which are usually constructed of a metal such as aluminum. One of the types of spacers utilized comprises a small, generally rectangular block which is inserted between the convolutions of the spring intermediate the ends of the springs. Such blocks are grooved to accommodate the spring convolutions so that when the block is inserted between two adjacent spring convolutions, the convolutions are received in opposed grooves located on opposite sides of the block and spaced from each other by a distance corresponding to the thickness of the spacer between the troughs of the grooves. The other type of spacer which has previously been used to increase the effective length of a fatigued coil spring comprises an aluminum block of generally circular configuration which carries a groove in its upper surface, and which rests upon the spring retainer of the lower control arm of the automobile. The lowermost convolutions of the spring is supported in the mating groove at the top of the circular spacer. The aluminum metal of which this type of spacer is constructed, is made sufficiently soft to permit the effective diameter of the spacer to be altered in order to adapt the spacer to cooperation with springs of various sizes.

In the case of both of the types of spacers previously utilized, utilization of a metallic construction in the spacer results in the generation of a considerable noise when the spring flexes and frictionally slides upon the spacers. Moreover, there is, in the case of both of the spacers described above, a considerable degree of difficulty encountered in inserting the spacers between the convolutions of the coil spring, or between the lowermost convolution of the spring and the spring retainer of the lower control arm. Wedging forces of considerable magnitude are required in order to wedge the convolutions apart a sufficient distance to permit the spacers to be inserted. This is not only a time consuming and difficult task, but presents a not inconsiderable safety hazard to personnel who may suffer from mashed or pinched fingers as a result of the wedging tool slipping out from between the convolutions of the spring.

A further disadvantage of the types of spacers previously in use is the relatively incompressible characteristic of such spacers. When the spacers are inserted between the convolutions of the automobile coil spring, a certain amount of the resiliency of the coil spring is necessarily lost due to the introduction of the rigid spacer into the coil spring. In other words, even though the spacer may effectively increase the overall length of the coil spring by forcing apart two or more of the convolutions thereof, the spacer in effect acts as a rigid column placed in compression between the two members which are spaced apart by the coil spring, and to the extent that the rigid spacer constitutes a portion of the total length of the coil spring, the resiliency of the coil spring is decreased. The rigid or incompressible nature of these previous types of spacers has also resulted in the earlier destruction of the spacers due to cracking or splitting as the coil spring in which the spacers are positioned is subjected to severe road shocks and also overloading of the vehicle in which the coil springs are incorporated.

The present invention comprises a novel and highly effective spacer of the type which is used by inserting the spacer between two adjacent convolutions of a coil spring. Broadly, the spacer of the invention comprises a two-part segmented spacer which includes a pair of high density, synthetic resin blocks, each having a groove therein for receiving one of the adjacent convolutions of the coil spring, and a helical compression spring positioned between said blocks and biasing the blocks apart from each other. From this general description of the invention, it will be immediately apparent that one of the primary advantages of the spacer proposed by the invention is that it is not a rigid body lacking sufficient resilience to permit the adjacent convolutions of the coil spring which it is placed between from moving toward each other upon overloading of the coil spring, or upon subjection of the coil spring to sudden impact forces of large magnitude. The resiliency or spring factor of the helical compression spring which is utilized between the blocks is such that the spring effectively biases the two blocks of the spacer apart by an amount which increases the spacing between the adjacent coil spring convolutions when the automobile is placed under normal load conditions. On the other hand, the resiliency of the helical compression spring is not so great as to prevent the adjacent convolutions of the coil spring from being moved toward each other under the influence of an overload supported by the coil springs, or at times when the coil spring is subjected to jolts and sudden impact forces as, for example, those which are encountered in the usual operation of an automobile.

Considering more specifically the nature of the present invention, each of the blocks which constitute a major element of the invention are constructed of a high density, synthetic resin material and are each formed in the shape of a frustum of a cone. This configuration permits a considerable saving in the material of construction of the blocks, and yet permits the base of each of the blocks to be broadened so as to afford increased strength at that portion of the block which must provide a base of support for the helical compression spring located intermediate each of the blocks.

In the surfaces of each of the blocks which are contacted by the ends of the helical compression spring which is positioned between the blocks, a shallow frusto-spherical recess or depression is provided. This frusto-spherical depression is, in each case, formed upon the radius of an imaginary sphere, which radius is substantially equal to the radius of the convolutions of the helical compression spring. The purpose of the depressions formed in the described surfaces of each of the resin blocks is to permit one of the blocks to be placed in its supporting position in contact with its respective convolution of the coil spring, and then to allow the second resin block to be more easily pressed into position in supporting relation to the other convolution of the coil spring. The enhanced ease of insertion of the spacer in this manner is facilitated by the ability of the second of the blocks which is inserted to be pressed into position by pivoting the blocks at an angle about the end or terminal convolution of the helical compression spring. The manner in which the frusto-spherical recesses which are formed in the two resinous blocks of the segmented spacer facilitates the insertion of the spacer between the convolutions of the coil spring with greater ease will be better understood from the more detailed description of the invention which is set forth hereinafter.

Finally, each of the high density, synthetic resin blocks of the segmented spacer of the invention is provided with an annular flange which extends around the surface of each block forming the bottom of the frustum. The flanges function to retain the helical compression spring in proper position with respect to each of the blocks. The inside diameter of each of the annular flanges is substantially equal to the transverse diameter of the helical compression spring so that little or no play or opportunity for movement of the spring in a transverse direction with respect to the resinous blocks is possible. This construction assures the constant alignment of the helical compression spring with each of the spacer blocks, and also assists in maintaining the blocks in alignment with each other.

From the foregoing description of the invention, it will be apparent that the present invention provides a novel spacer for insertion between adjacent convolutions of fatigued coil springs, which spacer possesses a resilience sufficient to permit such adjacent convolutions to converge toward each other when compressional forces of large magnitude are brought to bear upon the coil spring containing the spacer.

Another object of the present invention is to provide a spacer which may be utilized between the convolutions of a fatigued coil spring to restore the coil spring more nearly to its original status than it has been heretofore possible to do utilizing the types of spacers previously utilized.

An additional object of the present invention is to provide a spacer for insertion between adjacent convolutions of the coil springs of automobiles, which spacer is capable of constantly following the movements of such adjacent convolutions during operation of the automobile so that a softer ride is provided in the automobile, and so that the spacers are less susceptible to loss by being displaced from between the convolutions of the coil springs at such times as said convolutions may be opened apart due to the relieving or removal of a substantial portion of the load under which such coil springs normally operate.

A further object of the present invention is to provide a segmented spacer for insertion between the convolutions of a coil spring under compression, which segmented spacer is constructed to permit the portions of the spacer which are in contact with each of the adjacent convolutions of the coil springs to move independently of each other whereby said spacer is relieved from the forces of shear and torque which would otherwise tend to shorten the operating life of such spacers.

Yet another object of the present invention is to provide spacers for insertion between adjacent convolutions of coil springs carrying a compressional load, which spacers may be more easily inserted between said adjacent convolutions than the types of spacers heretofore in use.

Other objects and advantages, in addition to those hereinbefore described and discussed, will become apparent to the reader as the following detailed description of the invention is read in conjunction with a perusal of the accompanying drawings which illustrate our invention.

Figure 1:
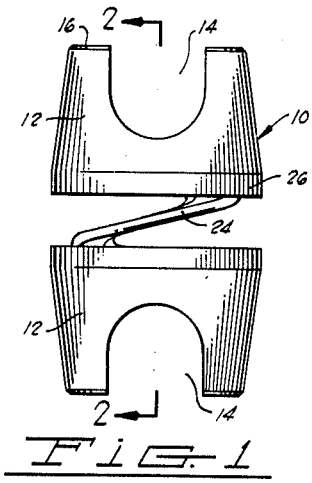
FIGURE 1 is a view in elevation of the spacer of the invention.

Referring now to the drawings in detail, and particularly to FIGURE 1, the spacer of the invention is designated generally by reference character 10. The spacer includes a pair of generally frusto-conically shaped, high density, synthetic resin blocks 12 which are identical in order that either of the blocks may be used at the top or the bottom when the spacer is inserted between adjacent convolutions of a vertically extending coil spring. A groove 14 is formed in one surface 16 of each of the blocks 12 and is dimensioned to receive one of the convolutions of the coil spring. At the base 18, or that surface opposite the surface 16, a frusto-spherical depression 20 is formed in each of the blocks 12. The radius of the imaginary sphere upon which each of the depressions 20 is formed is substantially equal to the radius of a helical compression spring 24 which is positioned between each of the blocks 12, and which contacts at its opposite ends the base 18 of each block.

As a final element of each of the spacer blocks 12, an annular flange 26 is formed around the outer edge of the base 18 of each of the blocks and extends toward the opposite block 12 so that the ends of the helical compression spring 24 may be retained in a fixed position with reference to the base surfaces 18 of each block 12 when the spacer is installed. It will be noted that the inside diameter of the annular flanges 26 is substantially equal to the diameter of the convolutions of the helical compression spring 24. The helical compression spring 24 is preferably flattened so as to provide an increased area at each of its ends for contact with the base 18 of the respective block 12.

Figure 4:
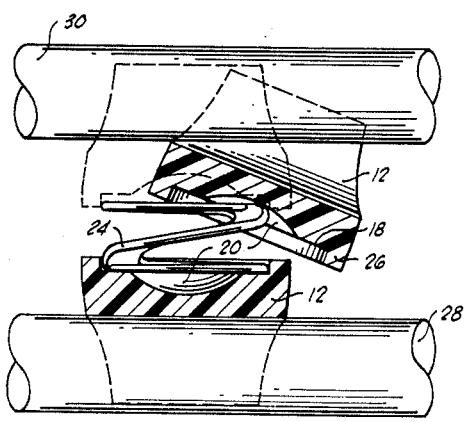
FIGURE 4 is a view partially in section and partially in elevation illustrating the manner in which the spacer of the invention is inserted between the adjacent convolutions of a coil spring. The spacer is sectioned as shown in FIGURE 2, while the coil spring is illustrated in elevation.

The function of the frusto-spherical depressions 20 in facilitating the insertion of the spacer 10 between adjacent convolutions of a coil spring is best illustrated in FIGURE 4. In this figure, the lowermost block 12 of the spacer has been placed in its operative position with the groove 14 therein engaging the lower of two adjacent coil spring convolutions 28. The helical compression spring 24 has been positioned inside the flange 26 of the lower block 12 and extends vertically upward from this block. The upper convolution 30 of the coil spring is then pried upwardly slightly by the use of any conventional tool of the type utilized to wedge apart the convolutions of fatigued coil springs. The upper block 12 of the spacer 10 is then placed in the position shown in full lines in FIGURE 4.

Figure 2:
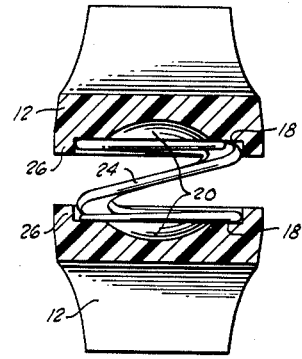
FIGURE 2 is a view in section taken along line 2—2 of FIGURE 1.
Figure 3:
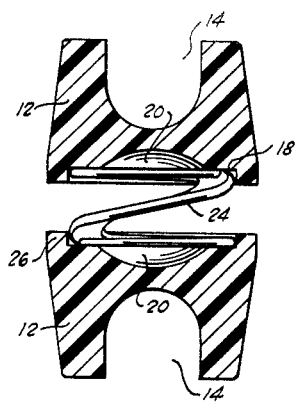
FIGURE 3 is a view in section taken through the spacer of FIGURE 1 at a right angle to the section shown in FIGURE 2.

It will be noted that in this position of the upper block 12, the uppermost convolution of the coil spring 24 is received in the frusto-spherical depression 20 of the upper block 12. A greater amount of clearance is thus provided between the groove 14 in the upper block 12 and the upper convolution 30 of the coil spring than would otherwise be available. As the upper block 12 is pressed into the dashed line position shown in FIGURE 4, the helical compression spring 24 snaps into the same position with respect to the upper block 12 that it occupies with respect to the lower block 12. In other words, once the upper of the two blocks 12 has been pressed into its operative position, the two blocks 12 and the helical compression spring 24 will appear as shown in FIGURES 1, 2 and 3. It will be readily apparent that the principle of the inclined plane has been employed to achieve a mechanical advantage in the insertion of the upper of the two blocks 12 in that the uppermost convolution of the helical compression spring 24 is caused to slide along the inclined surface of the frusto-spherical depression 20 from its position shown in FIGURE 4 to its position shown in FIGURE 3.

Figure 5:
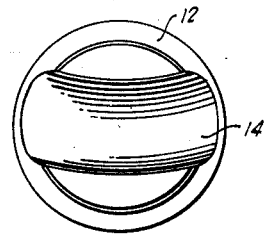
FIGURE 5 is a plan view of a modified embodiment of the invention.

In a modified embodiment of the invention, the grooves 14 in the spacer blocks 12 are arced to conform to the curvature of the convolutions of the coil springs in which they are used. This construction is illustrated in FIGURE 5.

From the foregoing description of the invention, it will be apparent that the segmented spacer of the present invention provides a number of important advantages over the types of spacers which have previously been utilized to separate the adjacent convolutions of sagging coil springs. Thus, the segmented spacer is adapted to follow each and every movement of the adjacent convolutions of the spring, regardless of the conditions of operation to which the coil spring may be subjected. The helical compression spring which is inserted between the two high density, synthetic resin blocks constantly biases these blocks apart from each other so that the spacers are not lost from between the convolutions of the coil spring when the load under which the coil spring normally operates is suddenly relieved. Also, the particular configuration of the two resinous blocks which are included in the segmented spacer of the invention permits the blocks to be much more easily inserted between the convolutions of the coil spring than has heretofore been possible. The high density, synthetic resin construction of the spacer blocks assures a long service life and the elimination of noise engendered by the metal to metal contact obtaining when spacers of the type previously used are employed. The resin used in the construction of the spacers of the invention is preferably a high density polymerized ethylene of the type sold under the tradename Marlex. However, other high density resins having relatively low coefficients of friction, such as polymerized halohydrocarbons and polymerized amides sold under the tradenames KEL-F, Teflon and nylon, may also be used.

Changes may be made in the combination and arrangement of parts or elements as heretofore set forth in the specification and shown in the drawings, it being understood that changes may be made in the embodiments disclosed without departing from the spirit and scope of the invention as defined in the following claims.

We claim:
1. In combination with a coil spring, a spacing element positioned between adjacent convolutions of the spring for biasing said adjacent convolutions apart from each other, comprising:
    (a) a first block having opposed upper and lower substantially parallel surfaces, and having a groove formed in said upper surface and receiving one of the convolutions of said spring;
    (b) a second block having opposed upper and lower substantially parallel surfaces, and having a groove formed in said lower surface and receiving one of the convolutions of said spring; and
    (c) a helical spring interposed between said first and second blocks and contacting the lower surface of said first block and the upper surface of said second block for biasing said blocks apart from each other, said blocks each being provided with a retaining flange extending toward the opposite block from the adjacent surfaces of said blocks, said flanges having a generally annular configuration for retaining the ends of said helical spring in contact with the respective surfaces of said blocks.

2. In combination with a coil spring, a spacing element positioned between adjacent convolutions of the spring for biasing said adjacent convolutions apart from each other comprising:
    (a) a first block having opposed upper and lower substantially parallel surfaces, and having a groove formed in said upper surface and receiving one of the convolutions of said spring;
    (b) a second block having opposed upper and lower substantially parallel surfaces, and having a groove formed in said lower surface and receiving one of the convolutions of said spring; and
    (c) a helical spring interposed between said first and second blocks and contacting the lower surface of said first block and the upper surface of said second block for biasing said blocks apart from each other, the lower surface of said first block and the upper surface of said second block each being provided with a frusto-spherically shaped recess centrally positioned in the respective surface to facilitate the insertion of said spacer between said coil spring convolutions by permitting said first block to be more easily pressed between the upper end of said helical spring and a convolution of said coil spring.

3. A spacer adapted for insertion between adjacent convolutions of a coil spring comprising:
    a first block having opposed upper and lower substantially parallel surfaces, and having a groove formed in said upper surface for receiving one of the convolutions of said spring;
    a second block having opposed upper and lower substantially parallel surfaces, and having a groove formed in said lower surface for receiving one of the convolutions of said spring; and,
    a resilient member interposed between said first and second blocks and contacting the lower surface of said first block and the upper surface of said second block for biasing said blocks apart from each other, the lower surface of said first block and the upper surface of said second block each being provided with a frusto-spherically shaped recess centrally positioned in the respective surface to facilitate the insertion of said spacer between said spring convolutions by permitting said first block to be more easily pressed between the upper end of said resilient member and a convolution of said coil springs.

References Cited in the file of this patent
UNITED STATES PATENTS

| | | |
|---|---|---|
| 201,512 | Hansell | Mar. 19, 1878 |
| 2,206,315 | Zimmerman | July 2, 1940 |
| 2,850,274 | Villar | Sept. 2, 1958 |
| 2,904,329 | Joseph | Sept. 15, 1959 |
| 2,977,405 | Warnock | Mar. 24, 1961 |
| 3,034,777 | Osterhoudt | May 15, 1962 |